J. J. McDONALD.
AUTOMATIC FLUID REGULATOR.
APPLICATION FILED SEPT. 17, 1906.
960,033.
Patented May 31, 1910.
2 SHEETS—SHEET 2.
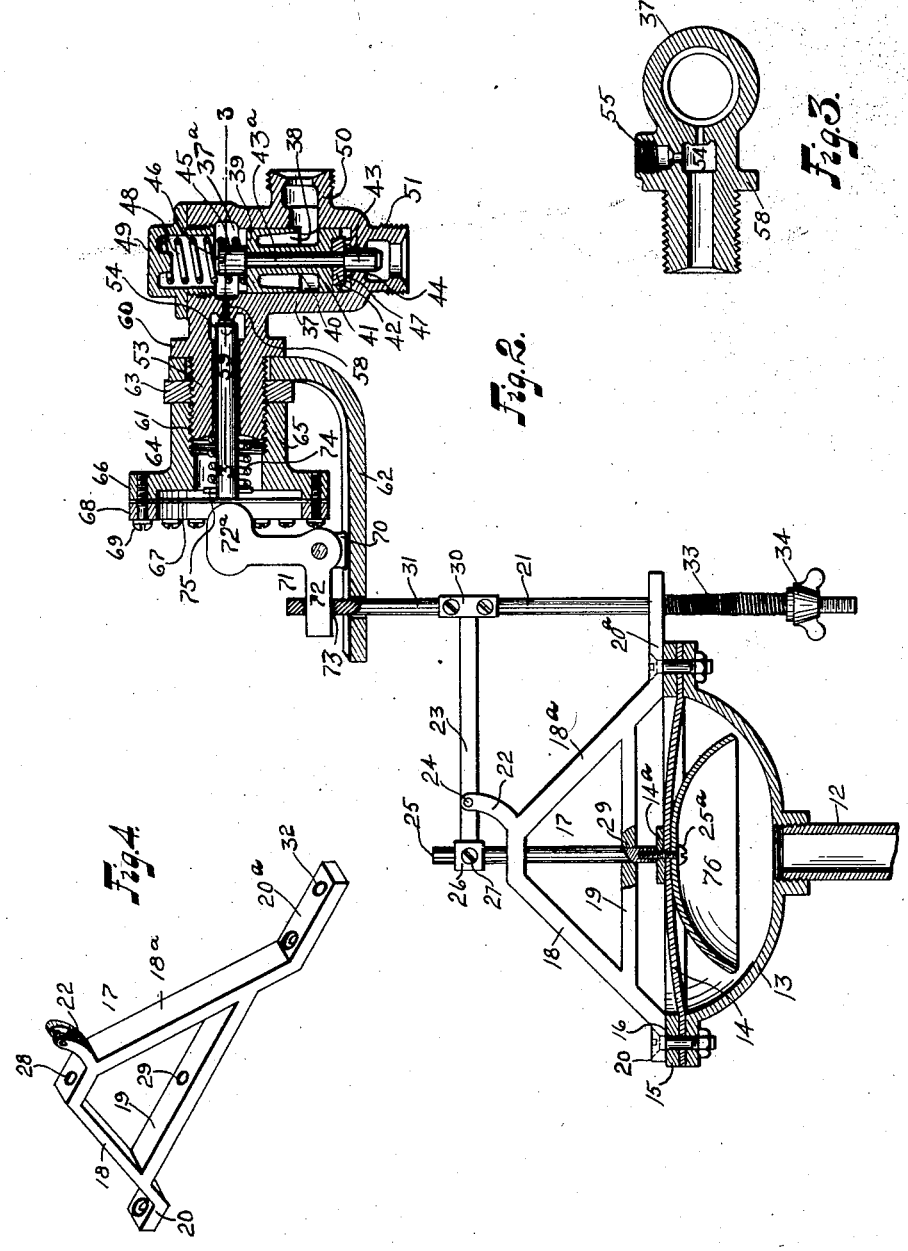
Witnesses:
G. A. Myers.
Brennan&West.
Inventor
James J. McDonald
by Bates, Fouts & Hull
Attorneys.

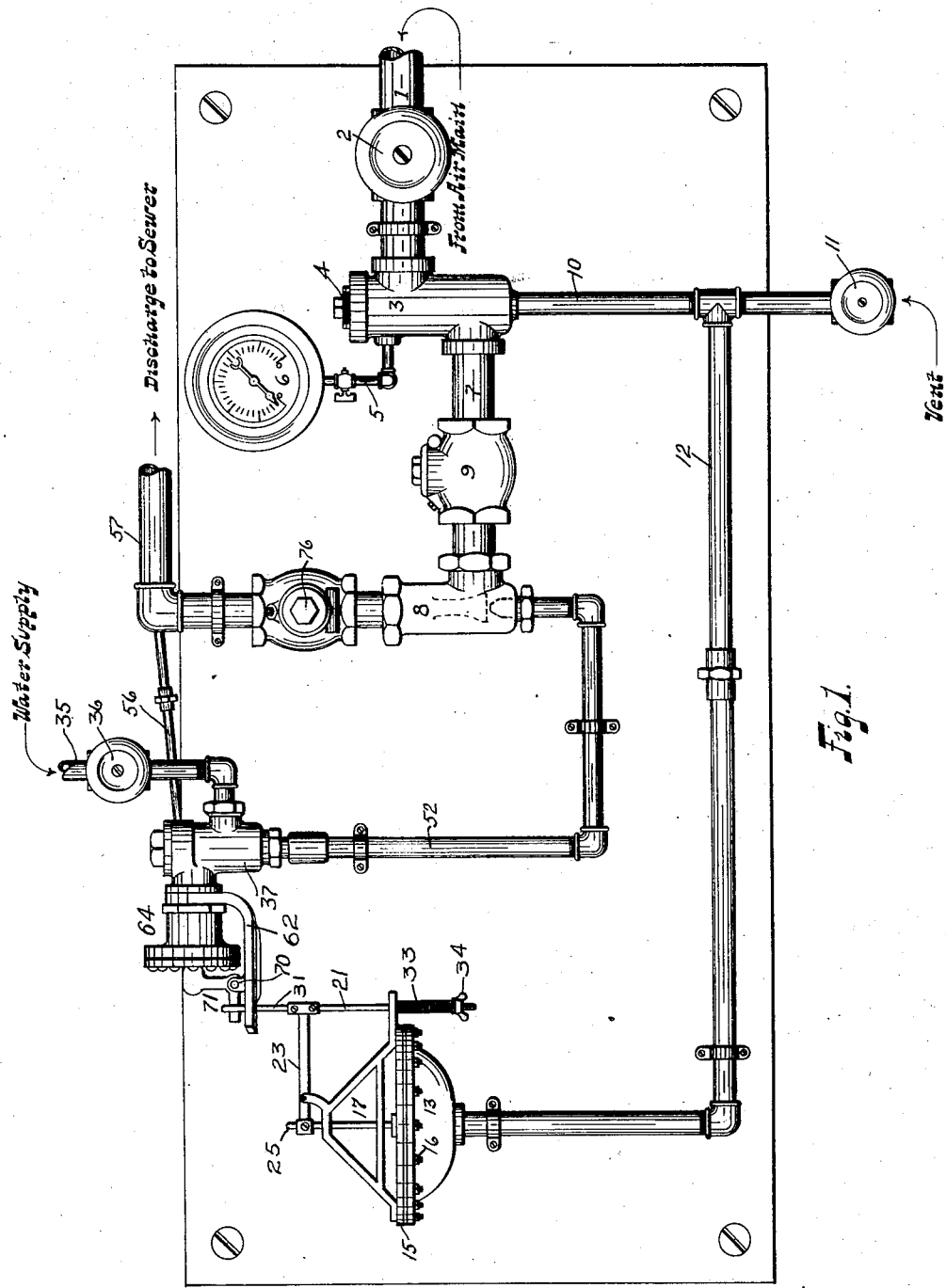

UNITED STATES PATENT OFFICE.

JAMES J. McDONALD, OF CLEVELAND, OHIO.

AUTOMATIC FLUID-REGULATOR.

960,033.

Specification of Letters Patent.   Patented May 31, 1910.

Application filed September 17, 1906.   Serial No. 334,882.

*To all whom it may concern:*

Be it known that I, JAMES J. McDONALD, a citizen of the United States, residing at Cleveland, in the county of Cuyahoga and State of Ohio, have invented a certain new and useful Improvement in Automatic Fluid-Regulators, of which the following is a full, clear, and exact description, reference being had to the accompanying drawings.

My invention relates generally to apparatus for automatically regulating the flow of one fluid by variations in the condition or pressure of another fluid, or for automatically regulating the flow of fluid in one conduit or system by variations in the condition or pressure of fluid in another conduit or system.

While my apparatus is particularly useful in connection with heating systems wherein the supply of the heating agent is automatically maintained by the intermittent flow of an exhausting fluid and is especially useful in connection with systems wherein the heating agent is circulated at and below atmospheric pressure, it will be understood that it is susceptible of more general application,—wherever it is desirable to control or regulate the flow and pressure of fluids.

The general object of the invention is to render apparatus of this kind positive and reliable in operation and readily responsive to changes in the condition or pressure of such fluids and to improve the details of construction thereof.

Generally speaking, the invention may be devised as consisting of the combinations of elements, for the purposes specified, set forth in the claims hereto annexed.

In the drawings, Figure 1 represents an elevation of a regulating system constructed in accordance with my invention. Fig. 2 represents an enlarged sectional detail of a fluid controlling valve and the operating mechanism therefor; Fig. 3 represents a sectional view on the line 3—3 of Fig. 2, the controlling valve being omitted; and Fig. 4 an enlarged perspective detail of the frame which supports the lever and stem by which the controlling valve is put into and out of operation.

As previously stated, my invention is particularly well adapted for use in connection with heating systems wherein the steam or other heating agent is circulated at a pressure below that of the atmosphere, and I have therefore shown an embodiment thereof that is adapted for this purpose.

As is well known by those skilled in the heating art, provision should be made for automatically removing the air from the air mains of such systems when the pressure in said mains reaches a predetermined amount or, as the steam is circulated in such systems under a pressure below that of the atmosphere, to remove the air from the air mains when the partial vacuum in such mains approximates to a predetermined degree the pressure of the atmosphere. My apparatus is shown as arranged for connection in such a system, it being unnecessary to indicate the radiators, steam supply thereto, and receptacle to which the water of condensation returns, the details of these parts and the manner of connecting the same being well known to those skilled in the art.

1 represents a pipe which may be connected into the air line of a heating system, said pipe being provided with a valve 2 of any approved construction.

3 represents a casing to the upper part of which the pipe 1 is connected. This casing is provided with a removable plug 4 and with a branch pipe 5 leading to a gage 6. From the lower portion of casing 3 a pipe 7 projects laterally, said pipe communicating with an exhauster or ejector 8, of ordinary construction, a check valve 9 being interposed between the casing 3 and the exhauster 8. From the bottom of the casing 3 extends the pipe 10. The lower end of this pipe is provided with a valve 11, whereby said pipe and the pipe 1 may be vented.

12 denotes a pipe extending laterally from pipe 10 and communicating with the interior of a diaphragm chamber 13. The upper end of chamber 13 is closed by means of the diaphragm 14 clamped thereto, as by a ring 15 and bolts 16.

Secured to the upper end of the diaphragm chamber is the frame 17. This frame is of a general A-shape and comprises the two converging side members 18 and 18ª, a cross bar 19 and feet or extensions 20 and 20ª, by means of which it is secured to the ring 15 by two of the bolts 16. The foot 20ª is extended beyond the diaphragm chamber and is provided with a perforation for the reception of a rod 21. The inclined member 18ᵃ is also provided, near the upper extremity thereof and on the same side as the foot 20ᵃ, with an upwardly projecting lug 22, the upper end of which is forked for the reception of the lever 23, which is pivoted between the forks of the lug 22 by means of a pin 24. The short end of lever 23 is adjustably connected with a stem 25 by means of a sleeve 26 and set screw 27. The stem 25 projects through vertically alined openings 28 and 29, the former opening being provided in the top of the frame 17, centrally thereof, and the latter being formed in the cross bar 19. The lower end of stem 25 is connected to the diaphragm 14, as by means of a screw 25ᵃ extending through the diaphragm from beneath, through a washer 14ᵃ on top of the diaphragm, and being threaded into the stem. The outer end of lever 23 is forked at 30 and the upper and lower portions of the fork are connected to the lower and upper portions respectively of the link 31 and the rod 21. The rod 21 extends through a perforation 32 in the outer portion of foot or extension 20ᵃ and is provided below such foot or extension with a helical spring 33. The lower extremity of the rod 21 is threaded and is provided with a wing nut 34 whereby the spring 33 may be readily adjusted. The object of the diaphragm 14, stem 25, lever 23, rod 21, link 31, and supporting frame 17 is to provide simple and effective means for controlling the flow of the exhausting fluid when the pressure in the air line reaches a predetermined degree, such degree being dependent upon the thermal conditions in the heating system. The manner in which the movement of the diaphragm is transmitted to the valve which controls the flow of the ejecting or exhausting fluid, will now be described.

35 represents the pipe or conduit through which the exhausting fluid is supplied to the ejector or exhauster 8. The fluid may be water, as indicated on Fig. 1, the water being supplied from the house system. This pipe is provided with a valve 36 and a valve chamber 37. Within this chamber is located a differential valve 38. This valve may be briefly described herein as follows. The valve comprises a double piston, the upper piston or disk 39 of which is connected by an integral cylindrical sleeve 40 with the lower combined piston and valve disk 41. The lower surface of disk 41 is recessed for the reception of the packing or washer 42. This packing or washer is held in place by a cylindrical extension 43 of the valve stem 43ᵃ. The extension 43 fits an outlet opening 44 in the lower portion of the valve casing 37, while stem 43ᵃ extends through the cylindrical sleeve 40 and is provided at its upper end with an adjusting sleeve 45 resting on the upper surface of piston 39 and provided with a slot 46 for the reception of a screw-driver, whereby the stem may be adjusted for the purpose of clamping the washer or packing 42 firmly in place and whereby, on removal of sleeve 45, a new packing or washer may be substituted for an old one.

47 denotes an annular seat projecting upwardly from the wall within which outlet 44 is formed and surrounding said outlet. The seat 47 and washer or packing 42 constitute the valve proper through which water supplied through 50 may pass into pipe 52 and spring 48 is inserted in the upper portion of casing 37 with the lower end surrounding sleeve 45 and the upper end engaging the cap 49. The casing is provided with the nipples 50 and 51, to which reference has been made, for connection respectively with the water inlet pipe 35 and water outlet pipe 52 which leads to the exhauster or ejector 8.

The extension 43 of the stem 43ᵃ fits closely the walls of the outlet 44 and yet moves freely therein and is of such length as to be lifted entirely out of and above such outlet when the piston 39 and its connected parts are elevated in the manner hereinafter described. On the closing movement, the lower end of 43 enters the outlet and, owing to the close fit between the same and said outlet, the water which is caught or entrapped in the lower part of the casing below the valve disk 41 is prevented from flowing out quickly through the outlet, as it has to pass through the narrow opening or passage between 43 and the wall of 44. The motion of the valve disk is therefore checked at this end of its stroke and made gradual instead of sudden.

The casing 37 is provided with an integral extension 53 having therein a bore, the inner portion of which is enlarged to provide a chamber 54 provided with an outlet nipple 55 to which a vent pipe 56 is connected, said vent pipe connecting with a pipe 57 which discharges into a sewer or other waste. The upper portion of casing 37, above piston 38, contains a chamber 37ᵃ and is provided with a passageway 58 adapted to establish communication between such chamber and the chamber 54.

59 denotes a valve mounted within the bore of extension 53, with its inner end normally bearing against the outer end of passageway 58 and closing communication between chambers 54 and 37ᵃ. The extension 53 is provided with a flange or shoulder 60, and outside of said shoulder the extension is provided with the external screw thread 61.

62 denotes an L-shaped or angular bracket or chair, the vertical arm of which is provided with an opening or perforation enabling it to be slipped over the extension 53 and against the shoulder 60.

63 denotes a nut which is threaded on extension 53 and clamps the bracket or chair 62 firmly in place.

To dispense with the necessity for packing the valve 59, I employ therewith a diaphragm chamber 64. This chamber comprises a sleeve 65 which is threaded onto the extension 53 and engages the nut 63 to lock the same in place. The outer end of sleeve 65 is expanded to form a ring 66 against which the diaphragm 67 is clamped by means of a ring 68 and bolts 69. The outer end of the lower arm of the bracket or chair 62 projects beyond the diaphragm chamber and is provided with a pair of lugs 70, between which the rock arm or lever 71 is pivoted. One arm 72 of such lever extends through an opening 73 in the link 31, the outer end of 62 being perforated to permit the passage of the link 31 therethrough. The other arm 72$^a$ of the lever is provided with an extension which normally abuts against the diaphragm 67 in opposition to the end of valve 59. A spring 74 surrounds the outer portion of valve 59 and engages a pin 75 carried thereby, said spring tending to force the valve 59 off its seat. This tendency is resisted by the end of the arm 72$^a$ bearing against the opposite surface of the diaphragm.

The arrangement of parts should be such that under normal conditions the valve 59 is seated with its outer end engaging the inner surface of the diaphragm 67, while the inner end of 72$^a$ engages the outer surface of said diaphragm without any distortion or bending of the diaphragm.

As previously stated, the pipe 52 communicates with the ejector or exhausting chamber 8 and said chamber communicates with the pipe 57. This pipe is provided with a check valve 76.

With the arrangement of parts as above described, the operation is as follows: The pressure within the air main being normally less than that of the atmosphere, there is a tendency for the diaphragm 14 to be depressed by the superior pressure of the atmosphere on top of the same and, through the connections to rock the arm 72$^a$ toward the diaphragm 67 and hold the valve 59 against said seat and thereby prevent the exhauster from operating. This tendency of the diaphragm to be depressed is counteracted mainly by the spring 33, the tendency of which is to elevate the diaphragm, the spring 74 being of merely sufficient tension to unseat the valve 59 when the arm 72$^a$ is moved away from the diaphragm 67 and exercising no appreciable effect on the movement of the diaphragm. In fact, this spring may be dispensed with and the valve will be opened only by the pressure of the water on the inner end thereof, the main function of the spring being to prevent chattering of the valve. When the pressure in the air main reaches a predetermined amount, such pressure acting upwardly on the diaphragm 14 and assisted by spring 33 will rock lever 71 and move the end 72$^a$ away from diaphragm 67. This will cause the valve 59 to uncover the port 58 and the pressure within the chamber 37$^a$ will be relieved through port 58 and pipe 56. The pistons 39 and 41 are made to fit the walls of casing 37 closely and yet so as to enable them to move freely in said casing and to permit the passage of a thin film or current of water between them and the wall of the casing. The result is that, when the pressure above piston 39 has been reduced by venting the chamber 37$^a$ through port 58 and pipe 56, the upward pressure on the under surface of piston 39 and on the bottom of 41 (due to leakage around 41) is opposed only by the pressure on top of piston 41 and the diminished pressure on top of 39, which pressure is considerably less than the pressure in the inlet 50. This difference in pressure causes the pistons and attached packing and valve stem to be lifted quickly to the highest position in the casing, thus freely opening the main valve and lifting the extension 43 above the outlet 44. This will permit the water from the pipe 35 to pass freely through nipples 50 and 51 and operate the ejector until the pressure within the air main has been reduced to a pre-determined amount, whereupon the pressure of the atmosphere acting on top of diaphragm 14 will cause upper end of 72$^a$ of lever 71 to be moved inwardly against the diaphragm 67 and seat the valve 59, whereupon the valve mechanism which controls the flow of water to the ejector will be closed.

The diaphragm, with its connections and spring 33 constitutes a regulator for the flow of the exhausting or ejecting fluid. By adjusting the nut 34, the tension of the spring 33 may be correspondingly adjusted to vary the resistance offered to the movement of the diaphragm to suit the requirements of the particular system with which the regulator is to be used. In heating systems, it is often desirable to vary the pressure in the air main under which the exhauster shall operate. By operating the nut 34, the tension of the sping may be adjusted to cause the pressure within the air line to approximately equal the atmospheric pressure on the outside of the diaphragm 14 before the exhauster will be put in operation. This will result in exhausting air from the main only when the pressure therein is nearly equal to that of the atmosphere, thereby circulating steam at substantially atmospheric pressure through the heaters. In moderately cold weather, however, the nut 34 can be further operated to adjust the spring 33 and cause the exhauster to operate when the pressure in the air main is considerably below that of the atmosphere.

When the valve 59, which controls the flow of the exhausting fluid, has been operated through the accumulation of pressure within the air main, the pressure on top of the piston 39 is relieved through the vent pipe 56, the valve 38 is elevated and the ejecting or exhausting fluid flows through casing 37, pipe 52, nozzle 52ª, entraining air from pipe 7, air main 1, and pipes 10 and 12 in a well known manner. The check valve 9 prevents any of the ejecting or exhausting fluid from passing into the air line and the check valve 76 prevents any equalizing of pressure between the opposite sides thereof after the exhauster has ceased to operate. When the pressure in the air main has been reduced to the predetermined degree, the atmospheric pressure on top of the diaphragm 14 will depress the latter, causing the lever arm 72ª to seat the valve 59, whereupon the valve in casing 37 will automatically close and cut off the supply of fluid to the exhauster.

The manner of connecting diaphragm 14 with the "Foster" valve provides a simple, compact construction and one that is particularly sensitive and responsive to changes in pressure in the air line. Very slight movement of the diaphragm 14 will cause the actuation of the "Foster" valve and, owing to the absence of lost motion in the connections, the exhauster will operate positively and automatically within the limits for which the apparatus is intended to operate. The underside of the diaphragm 14 has attached to the central portion thereof an inverted metal cup 76, the lower edge of which is adapted to seat on the subjacent portion of the chamber 13 when the pressure of the atmosphere on top of the diaphragm 14 is considerably in excess of the pressure within said chamber and the tension of the spring 33, thereby relieving the diaphragm and connected parts from undue strain.

Having thus described my invention, I claim:

1. In a fluid distributing system, the combination of a fluid supply conduit, a valve for controlling the flow of fluid through said conduit, and means for operating said valve, said means comprising a second fluid conduit, a diaphragm chamber communicating with the latter conduit, a diaphragm for said chamber, a frame carried by said diaphragm chamber and having a foot or extension projecting beyond the edge of said chamber, a stem connected with said diaphragm, a lever pivoted to said frame and connected to said stem, a connection between said lever and said valve, a rod connected with said lever and extending through said foot or extension, a spring on said rod, and means for adjusting the tension of said spring, substantially as specified.

2. In a fluid distributing system, the combination of a fluid supply conduit, a valve for controlling the flow of fluid through said conduit, and means for operating said valve, said means comprising a second fluid conduit, a fluid pressure motor having a chamber communicating with the latter conduit, a frame carried by said chamber and having a foot or extension projecting beyond the edge thereof, a stem connected with said motor, a lever pivoted to said frame and connected to said stem, a connection between said lever and said valve, a rod connected with said lever and extending through said foot or extension, and means on said rod and engaging said foot or extension for adjusting the pressure at which the motor shall operate, substantially as specified.

3. In a fluid distributing system, the combination of a fluid supply conduit, a valve for controlling the flow of fluid through said conduit, and means for operating said valve, said means comprising a second fluid conduit, a diaphragm chamber connected therewith, a diaphragm in said chamber, a frame secured to said chamber and having a foot or extension projecting beyond an edge thereof, a stem connected with said diaphragm, a lever pivotally supported from said frame and connected to said stem, a connection between said lever and said valve, and a rod connected to said lever and extending through the foot or extension of said frame, a nut on said rod and a spring interposed between said nut and said foot or extension, substantially as specified.

4. In a fluid distributing system, the combination of a fluid supply conduit, a valve for controlling the fluid through said conduit, and means for operating said valve, said means comprising a second fluid conduit, a diaphragm chamber connecting therewith, a diaphragm in said chamber, an A-shaped frame secured to said chamber, one of the sides of said frame being extended beyond the edge of said chamber and said frame having an arm or lug and being provided with alined perforations in the cross bar and upper portion of said frame, a stem connected with the diaphragm and extending through said perforations, a lever pivoted to said arm or lug and connected to said stem, a link connected to said lever, a rock arm connected with said link and adapted to operate said valve, and a tension device connected with said lever for varying the pressure under which the diaphragm is operated, substantially as specified.

5. In a fluid distributing system, the combination of a fluid supply conduit, a valve for controlling the fluid through said conduit, and means for operating said valve, said means comprising a second fluid conduit, a diaphragm chamber communicating therewith, a diaphragm in said chamber, an A-shaped frame secured to said chamber, one of the sides of said frame being extended beyond the edge of said chamber and said frame having adjacent the upper portion thereof an arm or lug and being provided with a perforation in the cross bar thereof, a stem connected with the diaphragm and extending through said perforation, a lever pivoted to said arm or lug and connected to said stem, a connection between said lever and said valve, and means connected with said lever for varying the pressure under which the diaphragm is operated, substantially as specified.

6. In a fluid distributing system, the combination of a fluid supply conduit, a valve for controlling the flow of fluid through said conduit, and means for operating said valve, said means comprising a second fluid conduit, a diaphragm chamber communicating therewith, a diaphragm in said chamber, a frame supported by said chamber, said frame being of substantially A-shape and comprising converging side members and a cross bar, said frame being provided with alined perforations in the cross bar and in the top thereof, a stem connected with said diaphragm and extending through said perforations, a lever connected to said stem, a link connected with said lever, a rock arm connected with said link and adapted to operate said valve, and a rod also connected to said lever and extending therefrom in a direction opposite to said link, and means connected with said rod for adjusting the resistance offered to the movement of said diaphragm, substantially as specified.

7. In a fluid distributing system, the combination of a fluid supply conduit, a valve for controlling the flow of fluid through said conduit, and means for operating said valve, said means comprising a second fluid conduit, a diaphragm chamber communicating therewith, a diaphragm in said chamber, a frame supported by said chamber, said frame being of substantially A-shape and comprising converging side members and a cross bar, said frame being provided with alined perforations in the cross bar and in the top thereof and having a lug or arm projecting therefrom, a stem connected with said diaphragm and extending through said perforations, a lever connected to said stem and pivoted to said lug or arm, a link connected with said lever, means for operating said valve from said link, and a rod also connected to said lever and extending therefrom in a direction opposite to said link, and means connected with said rod for adjusting the resistance offered to the movement of said diaphragm, substantially as specified.

8. In a fluid distributing system, the combination of a fluid supply conduit, a valve for controlling the flow of fluid through said conduit, and means for operating said valve, said means comprising a diaphragm chamber, a diaphragm in said chamber, a second fluid conduit in communication with said chamber, a lever having one end thereof connected to said diaphragm and having its other end provided with a yoke, a link pivoted in said yoke and projecting therefrom in one direction, a connection between said link and said valve, a rod connected with said yoke and projecting therefrom in the opposite direction from said link, and means on said rod for varying or adjusting the pressure under which said diaphragm shall operate, substantially as specified.

9. In a fluid distributing system, the combination of a fluid supply conduit, a valve for controlling the flow of fluid through said conduit, and means for operating said valve, said means comprising a diaphragm chamber, a diaphragm in said chamber, a second fluid conduit in communication with said chamber, a lever connected to said diaphragm and having a yoke, a link pivoted in said yoke and projecting therefrom in one direction, a connection between said link and said valve, a rod connected with said yoke and projecting therefrom in the opposite direction from said link, a spring on said rod, and means for adjusting the tension thereof to vary the pressure at which said diaphragm shall operate, substantially as specified.

10. In a fluid distributing system, the combination of a fluid supply conduit, a valve for controlling the flow of fluid through said conduit, and means for operating said valve, said means comprising a second fluid conduit, a pressure motor operatively connected with the latter conduit, a frame having a guide opening therein, a stem connected with said motor and projecting through said opening, a lever pivoted to said frame and connected to said stem, a lever for said valve, a connection between said levers, and adjustable resistance for varying the pressure at which the motor shall operate, substantially as specified.

11. In a fluid distributing system, the combination of a fluid supply conduit, a valve for controlling the flow of fluid through said conduit, and means for operating said valve, said means comprising a second fluid conduit, a fluid pressure motor operatively connected with the latter conduit, a frame having a guide opening, a stem extending through said opening and connected with said motor, an arm or lug carried by said frame, a lever pivoted to said arm or lug and connected to said stem, a link connected to said lever a valve-operating arm or lever connected to said link, and an adjustable resistance for varying the pressure at which the motor will operate, substantially as specified.

12. The combination, with a fluid supply pipe or conduit, of a valve for controlling the flow of fluid therethrough, and means for operating the same, said means comprising a second pipe or conduit, a fluid pressure motor having a chamber connected therewith, a frame supported by said chamber, said frame having a pair of converging arms, a cross bar connecting said arms, means for securing the divergent ends of said arms to said chamber, a foot or extension for one of said arms projecting beyond the chamber, a stem connected to said motor, a perforation being provided for said stem in said cross bar, a lever pivoted to said frame and connected to said stem, a connection between said lever and said valve, a rod connected to said lever and extending through said foot or extension, and an adjustable resistance on said rod for regulating the pressure at which the motor shall operate, substantially as specified.

13. In a fluid distributing system, the combination of a fluid supply conduit, a valve for controlling the flow of fluid through said conduit, and means for operating said valve, said means comprising a bracket, an arm pivotally supported by said bracket and adapted to operate said valve, and means for operating said arm, said means comprising a link connected to said arm, a fluid pressure motor connected to said link, and means for varying the resistance offered by said motor to its operating fluid, substantially as specified.

14. In a fluid distributing system, the combination of a fluid supply conduit, a valve for controlling the flow of fluid through said conduit, and means for operating said valve, said means comprising a casing inclosing said valve, a diaphragm closing the end of said casing and bearing against said valve, a bracket or chair projecting beyond said diaphragm, a rock arm pivotally supported by said bracket or chair, a link projecting through said bracket and connected to said rock arm, and means for operating said link, substantially as specified.

15. In a fluid distributing system, the combination of a fluid supply conduit, a valve for controlling the flow of fluid through said conduit, and means for operating said valve, said means comprising a casing inclosing said valve, a diaphragm closing the end of said casing and adapted to bear against said valve, a bracket or chair projecting beyond said diaphragm, a rock arm pivotally supported by said bracket or chair, a link projecting through said bracket and connected to said rock arm, and means for automatically operating said link by variations in fluid pressure, substantially as specified.

16. The combination, with a fluid supply pipe, of a valve for controlling the flow of fluid through said pipe, said valve comprising a casing provided with a diaphragm chamber, a diaphragm in said chamber, a valve having an end engaging the inner face of said diaphragm, a rock arm pivotally supported adjacent said diaphragm and having a portion thereof engaging the outer surface of the diaphragm and means for automatically and intermittently rocking said arm.

17. The combination, with a fluid supply pipe, of a valve in said pipe comprising a casing, a valve body in said casing, an angular bracket secured to said casing, a valve-operating member pivoted to said bracket and adapted to operate said valve, a rod or link extending through said bracket and connected with the valve-operating member, and means for operating said rod or link, substantially as specified.

18. The combination, with a fluid supply pipe, of a valve for controlling the flow of fluid through said pipe, said valve comprising a casing having a threaded extension, a valve body in said casing and having a stem projecting through said extension, an angular bracket having one arm thereof applied to said extension, a diaphragm chamber threaded on said extension and inclosing the outer end of the valve stem, a rock arm pivoted to the other arm of said bracket and engaging the outer surface of said diaphragm, said last mentioned bracket arm having a perforation therethrough, a link or rod extending through said perforation and operatively connected with said rock arm and means for operating said rod, substantially as specified.

19. The combination, with a fluid supply pipe, of a valve for controlling the flow of fluid through said pipe, said valve comprising a casing, a valve body in said casing, a diaphragm chamber carried by said casing, a diaphragm in said chamber abutting against the said valve body, a rock arm having one portion thereof abutting against said diaphragm on the opposite side thereof from said valve body, a lever engaging one part of said rock arm, a tension regulator carried by said lever and a fluid motor to operate the said lever.

20. The combination, with a fluid supply pipe, of a valve controlling the flow of fluid through said pipe, said valve comprising a casing and a valve body therein having a stem projecting through said casing, an angular bracket having one arm thereof applied to said casing and its other arm projecting beyond said casing, a rock arm member mounted upon the said bracket for operating the aforesaid valve, a lever engaging one part of said rock arm, a tension regulator carried by said lever and a fluid motor to operate the said lever.

21. The combination, with an exhausting device, of means for operating said device, said means comprising a fluid conduit, a diaphragm chamber communicating therewith, a diaphragm for said chamber, an A-shaped frame carried by said chamber and comprising converging side members and a cross bar, said frame being provided with alined perforations in the cross bar and in the apex thereof, a stem connected with the diaphragm and extending through said perforations, a lever connected to said stem, and a connection between said lever and said device, substantially as specified.

22. The combination, with an exhausting device, of means for operating said device, said means comprising a fluid conduit, a diaphragm chamber communicating therewith, a diaphragm for said chamber, an A-shaped frame carried by said chamber and comprising converging side members and a cross bar, said frame being provided with alined perforations in the cross bar and in the apex thereof, a stem connected with the diaphragm and extending through said perforations, a connection between said stem and said exhausting device, and means for varying the pressure at which the stem will be operated by the diaphragm, substantially as specified.

In testimony whereof, I hereunto affix my signature in the presence of two witnesses.

JAMES J. McDONALD.

Witnesses:
G. A. MYERS,
J. B. HULL.